(12) United States Patent
Zhao et al.

(10) Patent No.: US 11,071,061 B2
(45) Date of Patent: Jul. 20, 2021

(54) COMMUNICATION SYSTEM, GATEWAY, TERMINAL AND COMMUNICATION METHOD BASED ON LORA TECHNOLOGY

(71) Applicant: BOE TECHNOLOGY GROUP CO., LTD., Beijing (CN)

(72) Inventors: Kai Zhao, Beijing (CN); Baoyu Shi, Beijing (CN); Xinyi Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/922,111

(22) Filed: Jul. 7, 2020

(65) Prior Publication Data

US 2021/0014789 A1     Jan. 14, 2021

(30) Foreign Application Priority Data

Jul. 11, 2019     (CN) .......................... 201910624998.5

(51) Int. Cl.
*H04W 52/02*     (2009.01)
*H04L 5/00*     (2006.01)
*H04W 88/02*     (2009.01)
*H04W 88/16*     (2009.01)

(52) U.S. Cl.
CPC ....... *H04W 52/0229* (2013.01); *H04L 5/0048* (2013.01); *H04W 88/02* (2013.01); *H04W 88/16* (2013.01)

(58) Field of Classification Search
CPC . H04W 52/0229; H04W 88/02; H04W 88/16; H04W 52/0248; H04L 5/0048; Y02D 30/70
USPC ........................................................ 455/574
See application file for complete search history.

(56) References Cited

U.S. PATENT DOCUMENTS

| 2018/0132177 A1* | 5/2018 | Gandhi | ............. | H04W 52/0235 |
| 2019/0320602 A1* | 10/2019 | Doehling | ............. | A01G 27/003 |
| 2020/0245227 A1* | 7/2020 | Tao | ........................... | H04L 5/00 |

FOREIGN PATENT DOCUMENTS

CN     108932829 A     12/2018

* cited by examiner

*Primary Examiner* — Juan A Torres
(74) *Attorney, Agent, or Firm* — McDermott Will & Emery LLP

(57) ABSTRACT

A communication system, gateway, terminal, and communication method based on LoRa technology are provided. The system includes: a gateway configured to transmit an LoRa data packet containing a preamble, wherein duration of the transmission of the preamble is $n_1$; and a terminal configured to perform channel activity detection one time for a duration of $q_1$ each time after sleeping for a duration of $p_1$, continue to sleep for the duration of $p_1$ in response to the preamble not being detected, or receive and process the data packet and then continue to sleep for the duration of $p_1$ in response to the preamble being detected, wherein $p_1 > q_1$, and $p_1 + q_1$ is less than or equal to $n_1$.

14 Claims, 6 Drawing Sheets

COMMUNICATION SYSTEM, GATEWAY, TERMINAL AND COMMUNICATION METHOD BASED ON LORA TECHNOLOGY

CROSS-REFERENCE TO RELATED APPLICATION(S)

This application claims priority to the Chinese Patent Application No. 201910624998.5, filed on Jul. 11, 2019, entitled "Communication system, gateway, terminal and communication method based on LoRa technology", which is incorporated herein by reference in its entirety.

TECHNICAL FIELD

The present disclosure relates to the field of communication technology, and more particularly, to a communication system, gateway, terminal, and communication method based on LoRa technology.

BACKGROUND

The Long Range (LoRa) is a long-distance wireless transmission technology based on spread spectrum technology. In fact, the LoRa is also one of many Low Power Wide Area Network (LPWAN) communication technologies, and is firstly adopted and promoted by the Semtech company in the United States. This solution provides users with a simple wireless communication means which may achieve a long distance and low power consumption. At present, LoRa mainly operates in an Industrial, Scientific, and Medical (ISM) frequency band, which mainly comprises 433 MHz, 868 MHz, 915 MHz, etc.

The LoRa has an advantage of a long-distance capability in technology. A single gateway or base station may cover the entire city or hundreds of square kilometers. At a given location, the distance depends largely on an environment or obstacles.

In order to reduce power consumption of devices based on the LoRa technology, in the related technology, there is proposed a water meter data collection method based on LoRa low-power consumption wireless communication technology. In this method, a water meter terminal based on the LoRa technology actively reports data, and when the water meter terminal does not report data, the water meter terminal is in a turn-off state to reduce power consumption. This method is suitable for low frequency unidirectional data transmission systems. However, in an application scenario in which bidirectional data interaction is frequent, the terminal may not receive data in time and perform effective interaction in time.

SUMMARY

According to some embodiments of the present disclosure, there is provided a communication system based on Long Range (LoRa) technology, comprising:

a gateway configured to transmit an LoRa data packet containing a preamble, wherein duration of the transmission of the preamble is $n_1$; and a terminal configured to perform channel activity detection one time for duration of $q_1$ each time after sleeping for duration of $p_1$, continue to sleep for the duration of $p_1$ in response to the preamble not being detected, or receive and process the data packet and then continue to sleep for the duration of $p_1$ in response to the preamble being detected, wherein $p_1 > q_1$, and $p_1 + q_1$ is less than or equal to $n_1$.

In some embodiments, modes of the communication system comprises an operating mode and a non-operating mode, $p_1$ is a value of the duration of the sleeping in the operating mode, $q_1$ is a value of the duration of the channel activity detection in the operating mode, and the system further comprises:

a server configured to transmit an instruction for switching to the non-operating mode to the gateway, wherein the gateway is further configured to issue a non-operating mode parameter modification instruction to the terminal according to the received instruction for switching to the non-operating mode to control the terminal to modify corresponding parameters;

the terminal is further configured to correspondingly modify wireless communication parameters according to the non-operating mode parameter modification instruction issued by the gateway, adjust the duration of the sleeping to a value of $p_2$ in the non-operating mode and adjust the duration of the channel activity detection to a value of $q_2$ in the non-operating mode, and then return parameter modification confirmation information to the gateway; and the gateway is further configured to modify its own wireless communication parameters to wireless communication parameters in the non-operating mode after receiving the parameter modification confirmation information returned by the terminal, so that the duration of the transmission of the preamble of the transmitted LoRa data packet is adjusted to $n_2$, wherein $n_2 > n_1$, wherein $p_2 - q_2 > p_1 - q_1$, and $p_2 + q_2$ is less than or equal to $n_2$.

In some embodiments, the server is further configured to transmit an instruction for switching to the operating mode to the gateway;

the gateway is further configured to issue a data packet carrying an operating mode parameter modification instruction to the terminal according to the received instruction for switching to the operating mode to control the terminal to modify corresponding parameters;

the terminal is further configured to, according to the operating mode parameter modification instruction issued by the gateway, correspondingly modify the wireless communication parameters, adjust the duration of the sleeping to the value of $p_1$ in the operating mode and adjust the duration of the channel activity detection to the value of $q_1$ in the operating mode, and then return parameter modification confirmation information to the gateway; and the gateway is further configured to modify its own wireless communication parameters to wireless communication parameters in the operating mode after receiving the parameter modification confirmation information returned by the terminal, so that the duration of the transmission of the preamble of the transmitted LoRa data packet is adjusted to $n_1$.

According to some embodiments of the present disclosure, there is further provided a terminal based on Long Range (LoRa) technology, comprising:

a sleep control module configured to wake up the terminal each time after the terminal sleeps for duration of $p_1$ and transmit a channel activity detection notification;

a channel activity detection module configured to receive the channel activity detection notification, and then perform channel activity detection one time for duration of $q_1$, notify the sleep control module to continue to sleep in response to a preamble of an LoRa data packet which is transmitted by a gateway for duration of $n_1$ not being detected, or receive the data packet if the preamble is detected; and a data packet processing module configured to process the data packet received by the channel activity detection module and then notify the sleep control module to continue to sleep for the duration of $p_1$, wherein $p_1 > q_1$, and $p_1 + q_1$ is less than or equal to $n_1$.

In some embodiments, the data packet processing module is further configured to, after confirming that the data packet carries a non-operating mode/operating mode parameter modification instruction issued by the gateway, modify its own wireless communication parameters according to modification parameters carried in the non-operating mode/operating mode parameter modification instruction, adjust the duration of the sleeping to a value of $p_2/p_1$ in a non-operating mode/operating mode, and adjust the duration of the channel activity detection to a value of $q_2/q_1$ in the non-operating mode/operating mode, wherein $p_2 - q_2 > p_1 - q_1$, $p_2 + q_2$ is less than or equal to $n_2$, and $n_2$ is duration of transmission of a preamble of an LoRa data packet transmitted by the gateway in the non-operating mode.

According to some embodiments of the present disclosure, there is further provided a gateway based on Long Range (LoRa) technology, comprising:

a data packet transmission module configured to transmit an LoRa data packet containing a preamble, wherein duration of the transmission of the preamble is $n_1/n_2$ in an operating mode/non-operating mode; and an operating mode adjustment module configured to issue a non-operating mode/operating mode parameter modification instruction to a terminal according to an instruction for switching to a non-operating mode/operating mode transmitted by a server, to control the terminal to correspondingly modify its own wireless communication parameters, adjust duration of sleeping to a value of $p_2/p_1$ in the non-operating mode/operating mode and adjust duration of channel activity detection to a value of $q_2/q_1$ in the non-operating mode/operating mode; and modify wireless communication parameters of the gateway to wireless communication parameters in the non-operating mode/operating mode, so that the duration of the transmission of the preamble of the transmitted LoRa data packet is adjusted to a value of $n_2/n_1$ in the non-operating mode/operating mode, wherein $p_2 - q_2 > p_1 - q_1$, and $p_2 + q_2$ is less than or equal to $n_2$, and wherein $p_1$ is a value of the duration of the sleeping of the terminal in the operating mode, and $q_1$ is a value of the duration of the channel activity detection of the terminal in the operating mode.

According to some embodiments of the present disclosure, there is further provided a communication method based on Long Range (LoRa) technology, comprising:

performing, by the terminal, channel activity detection one time for duration of $q_1$ each time after sleeping for duration of $p_1$;

continuing, by the terminal, to sleep for the duration of $p_1$ if a preamble of an LoRa data packet which is transmitted by a gateway for duration of $n_1$ is not detected by the terminal; and receiving and processing, by the terminal, the data packet and then continuing to sleep for the duration of $p_1$ if the preamble is detected by the terminal, wherein $p_1 > q_1$, and $p_1 + q$ is less than or equal to $n_1$.

In some embodiments, the data packet is specifically a data packet carrying a non-operating mode parameter modification instruction; and before receiving and processing the data packet, the method further comprises:

transmitting, by the server, an instruction for switching to a non-operating mode to the gateway; and issuing, by the gateway, the data packet carrying the non-operating mode parameter modification instruction to the terminal according to the received instruction for switching to a non-operating mode;

processing the data packet specifically comprises:

after confirming that the data packet carries the non-operating mode parameter modification instruction issued by the gateway, modifying, by the terminal, its own wireless communication parameters according to modification parameters carried in the non-operating mode parameter modification instruction, adjusting the duration of the sleeping to a value of $p_2$ in the non-operating mode and adjusting the duration of the channel activity detection to a value of $q_2$ in the non-operating mode, and then returning parameter modification confirmation information to the gateway; and after receiving and processing the data packet, the method further comprises:

after receiving the parameter modification confirmation information returned by the terminal, modifying, by the gateway, the current wireless communication parameters to wireless communication parameters in the non-operating mode, so that the duration of the transmission of the preamble of the transmitted LoRa data packet is adjusted to $n_2$, wherein $n_2 > n_1$, wherein $p_2 - q_2 > p_1 - q_1$, and $p_2 + q_2$ is less than or equal to $n_2$.

BRIEF DESCRIPTION OF THE ACCOMPANYING DRAWINGS

DETAILED DESCRIPTION

In order to make the purposes, technical solutions and advantages of the present disclosure more clear, the present disclosure will be further described in detail below in conjunction with specific embodiments and with reference to the accompanying drawings.

The embodiments of the present disclosure will be described in detail below, and examples of the embodiments are shown in the accompanying drawings, throughout which the same or similar reference signs indicate the same or similar elements or elements having the same or similar functions. The embodiments described below with reference to the accompanying drawings are exemplary, and are only used to explain the present disclosure, but may not be construed as limiting the present disclosure.

It may be understood by those skilled in the art that unless specifically stated, the singular forms "a", "an", "said" and "the" used herein may also comprise plural forms. The expression "and/or" used herein comprises all or any of one or more associated listed items or all combinations thereof.

It should be illustrated that the ordinal numbers "first" and "second" used in the embodiments of the present disclosure are only used to distinguish one object from another unless they are clearly stated otherwise or may be determined from the context, and should not be construed as limiting the embodiments of the present disclosure, which will not be described in detail in subsequent embodiments.

Figure 1:
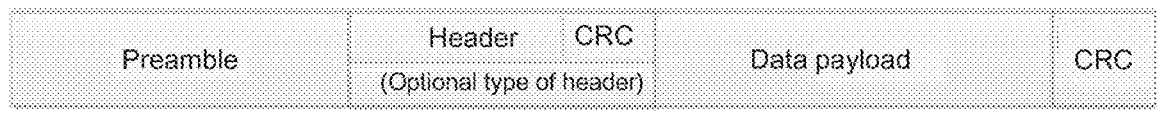
FIG. 1 is a schematic structural diagram of an LoRa data packet in the related art.

An LoRa data packet transmitted between a gateway and a terminal based on LoRa technology has a construction as shown in FIG. 1, and mainly comprises a preamble, an optional type of header, and a data payload. Here, the preamble is used to keep synchronization between a receiver and an input data stream. The preamble is used to remind a receiving chip that a valid signal is about to be transmitted, and please pay attention to receiving the valid signal, so as not to lose a useful signal. After the preamble is completely transmitted, valid data will be transmitted immediately.

A length of the preamble may be set between 10 and 65539 bits. Based on this mechanism, duration of transmission of a preamble of each data packet may be adjusted between 1.31 ms and 35.79 min. With Channel Activity Detection (CAD) technology, the preamble may be detected within 0.4 ms to 2 ms.

Therefore, the radio frequency chip may be placed into a sleep mode during a period after the CAD detection is completed and before the preamble is completely transmitted, which may effectively reduce power consumption.

Figure 2:
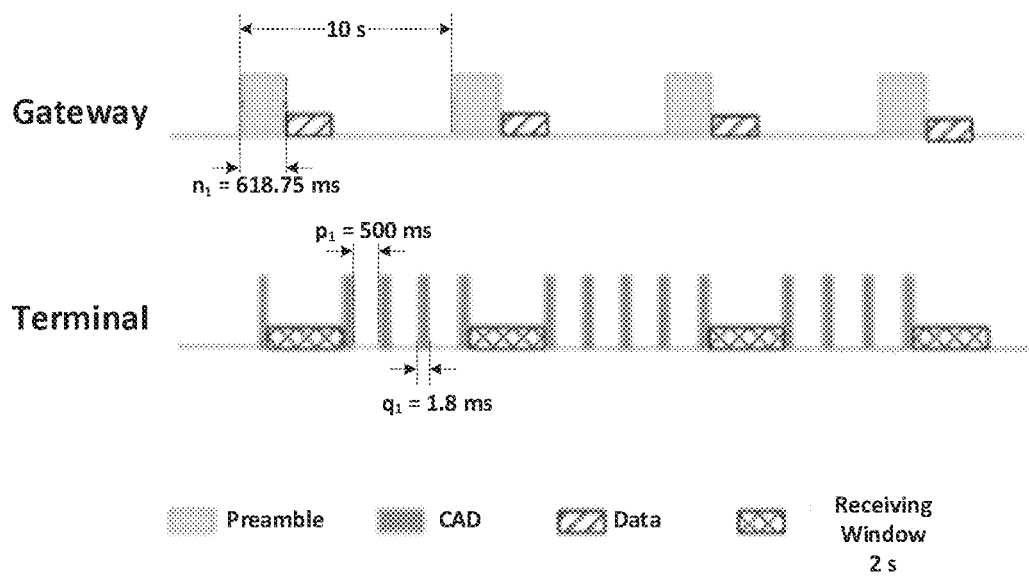
FIG. 2 is a schematic diagram of a communication principle based on LoRa technology according to an embodiment of the present disclosure.

Based on the above analysis, the principle of the technical solutions according to some embodiments of the present disclosure may be as shown in FIG. 2, in which a gateway transmits an LoRa data packet containing a preamble to a terminal, wherein duration of the transmission of the preamble is $n_1$; the terminal is woke up to perform channel activity detection one time for duration of $q_1$ each time after sleeping for duration of p the terminal continues to sleep for the duration of $p_1$ if the preamble is not detected, and the terminal receives and processes the data packet and then continues to sleep for the duration of $p_1$ to wait for a next wakeup process if the preamble is detected, wherein $p_1 > q_1$, and $p_1 + q_1$ is less than or equal to $n_1$. Since the terminal may complete channel activity detection at least one time within the duration of $p_1 + q_1$, and $p_1 + q_1 \leq n_1$, that is, $n_1$ is greater than or equal to the duration of $p_1 + q_1$, then the channel activity detection necessarily occur one time within the duration of $n_1$. In this way, it ensures that the terminal may perform channel activity detection on a preamble of each data packet of the gateway at least one time, which also ensures that the terminal may receive the data packet transmitted by the gateway in time and perform effective interaction in time. At the same time, since the duration of $p_1$ of the sleeping is greater than the duration of $q_1$ of the channel activity detection, the terminal is in a sleep state for most of time, which may greatly reduce the power consumption of the terminal device.

The technical solutions according to some embodiments of the present disclosure will be described in detail below with reference to the accompanying drawings.

Figure 3:
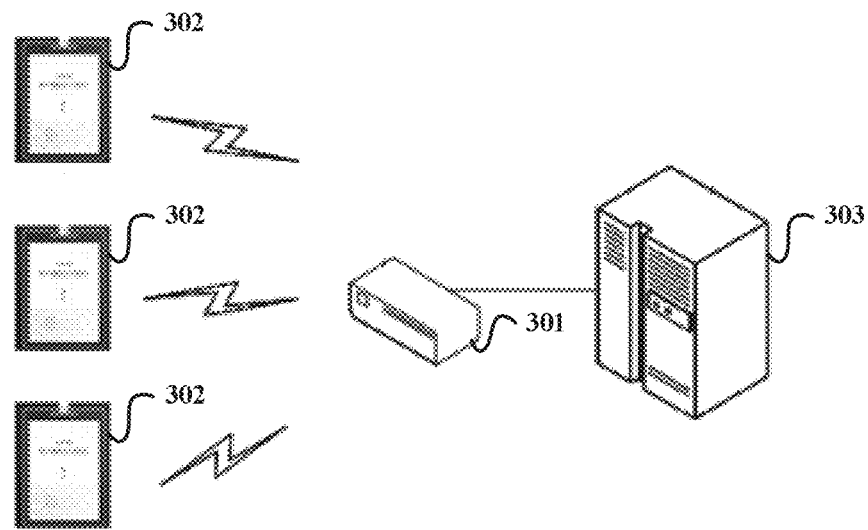
FIG. 3 is an architecture diagram of a communication system based on LoRa technology according to an embodiment of the present disclosure.

Some embodiments of the present disclosure provide a communication system based on LoRa technology. Architecture of the communication system is shown in FIG. 3, and comprises a gateway 301, a terminal 302, and a server 303.

Here, the terminal 302 is a terminal using LoRa wireless communication technology, and is configured to collect information and upload data to the gateway 301 through an LoRa wireless signal. The terminal 302 may specifically be a positioning badge.

The gateway 301 is a gateway based on the LoRa technology, and is configured to relay the data uploaded by the terminal 302 and issue data transmitted by the server 303 to the terminal 302.

The server 303 is configured to analyze the data uploaded by the terminal 302 and control behaviors of the gateway 301 and the terminal 302.

Specifically, the gateway 301 is configured to transmit an LoRa data packet containing a preamble, wherein duration of the transmission of the preamble is $n_1$.

The terminal 302 is configured to perform channel activity detection one time for duration of $q_1$ each time after sleeping for duration of $p_1$, continue to sleep for the duration of $p_1$ in response to the preamble being not detected; or receive and process the data packet and then continue to sleep for the duration of $p_1$ in response to the preamble being detected, wherein $p_1 > q_1$, and $p_1 + q_1$ is less than or equal to $n_1$.

For example, as shown in FIG. 2, among wireless communication parameters adopted by the gateway 301, a spreading factor SF=7, a carrier frequency is 433 MHz, a bandwidth is 125 kHz, and a preamble length is 600 bits. Then, the duration $n_1$ of the transmission of the preamble is equal to 618.75 ms. The duration $q_1$ of one channel activity detection process is about 1.8 ms, and in order to satisfy $p_1 + q_1 \leq n_1$, the duration $p_1$ of the sleeping needs to be less than or equal to 616.95 ms. For example, in practical applications, $p_1$=500 ms may be selected. It may be seen that the terminal 302 may sleep for up to 500 ms, and only wake up for 1.8 ms to perform channel activity detection, which may greatly save power consumption. At the same time, the channel activity detection is performed every 501.8 ms, which may not miss the detection of the preamble which is transmitted for the duration of 618.75 ms. Thereby, it ensures that the terminal 302 may receive the data packet transmitted by the gateway 301 in time without packet loss.

In other words, each time the gateway 301 transmits a data packet, a preamble is transmitted for 618.75 ms, the terminal 302 performs channel activity detection every 500 ms for sleeping, and the duration of the channel activity detection is about 1.8 ms. In this way, it takes at most 501.8 ms to complete the signal detection, that is, the duration of the transmission of the preamble is longer than maximum duration required to complete the signal detection, which may ensure that as long as there is a data packet ready to be transmitted, the channel activity detection may be successfully completed during the duration of the transmission of the preamble of the data packet. The radio frequency chip is not required to operate during the duration of 500 ms, and is controlled to enter a sleep mode. It only takes 500 ms to wake up the radio frequency chip to immediately perform the channel activity detection, which may achieve low power consumption.

In some embodiments, average current of the chip of the terminal 302 is 20 mA in a receiving mode and is 1 μA in the sleep mode. According to the selection of the above parameters, the average current of the terminal 302 may be calculated as:

(20×1.8+0.001×500)/501.8=0.072 mA.

It may be seen that the current of the terminal 302 has a very obvious decrease effect, which greatly reduces the power consumption of the terminal 302.

Figure 4:
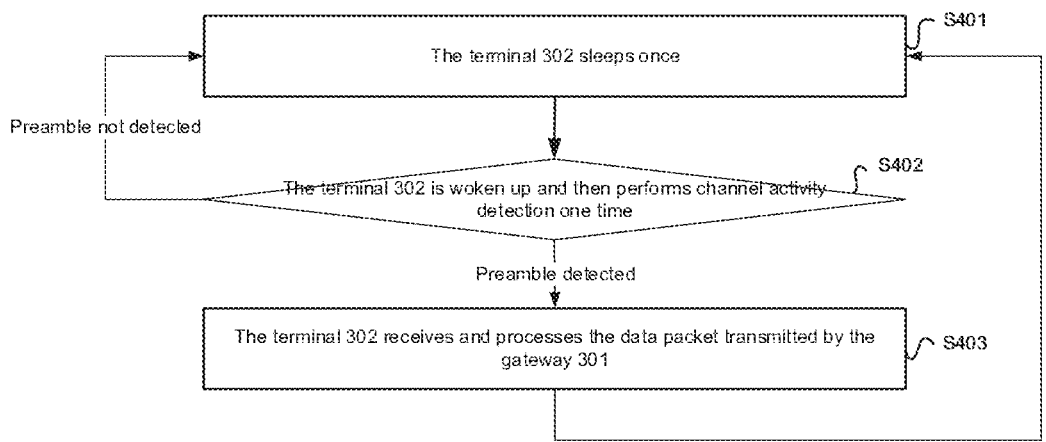
FIG. 4 is a flowchart of a communication method based on LoRa technology according to an embodiment of the present disclosure.

Some embodiments of the present disclosure provide a communication method based on LoRa technology. A specific process of the communication method is shown in FIG. 4 and comprises the following steps.

In step S401, the terminal 302 sleeps once.

In this step, the terminal 302 may sleep once for the duration of $p_1$.

In step S402, the terminal 302 is woke up and then performs channel activity detection one time; if the preamble is detected, step S403 is performed to receive and process the data packet; and if the preamble is not detected, the procedure jumps to step S401 to continue to perform a next sleep process.

Specifically, after set duration of sleeping in step S401 passes, in this step, the terminal 302 is woke up and performs channel activity detection one time for duration of $q_1$; during the channel activity detection for the duration of $q_1$, if the preamble of the LoRa data packet which is transmitted by the gateway for duration of $n_1$ is detected by the terminal 302, step S403 is performed to receive and process the data packet; and if the preamble of the LoRa data packet which is transmitted by the gateway for the duration of $n_1$ is not detected, the procedure jumps to step S401 to continue to perform the next sleep process.

In step S403, the terminal 302 receives and processes the data packet transmitted by the gateway 301 and then the procedure jumps to step S401 to continue to perform a next sleep process.

However, according to practical application scenarios, sometimes the terminal 302 is not in an operating state for 24 hours. For example, if the technical solution is applied to employee badges, the terminal 302 which serves as a badge during a period from 5 pm to 8 am the next day does not need to be online in real time. Thereby, if the gateway 301 and the terminal 302 are still in an operating state during this period, the transmission of the preamble during this duration seems a bit wasteful. If the longest preamble length is 65535 bits, the spreading factor SF=12, and the bandwidth is BW=125 kHz at this time, the duration of the transmission of the preamble may become 2147590 ms. At this time, the duration of the CAD detection of the terminal 302 becomes 61.1 ms, and the duration of the sleeping is set to 2147490 ms. According to the same principle, current consumption of the terminal 302 is reduced to (20×61.1+0.001×2147490)/(61.1+2147490)=0.0015 mA. In this way, the current consumption is reduced to 20% of the original current consumption. It may be seen that according to different scenarios, the change of the wireless communication parameters of the gateway and the terminal may further reduce the power consumption.

Figure 5:
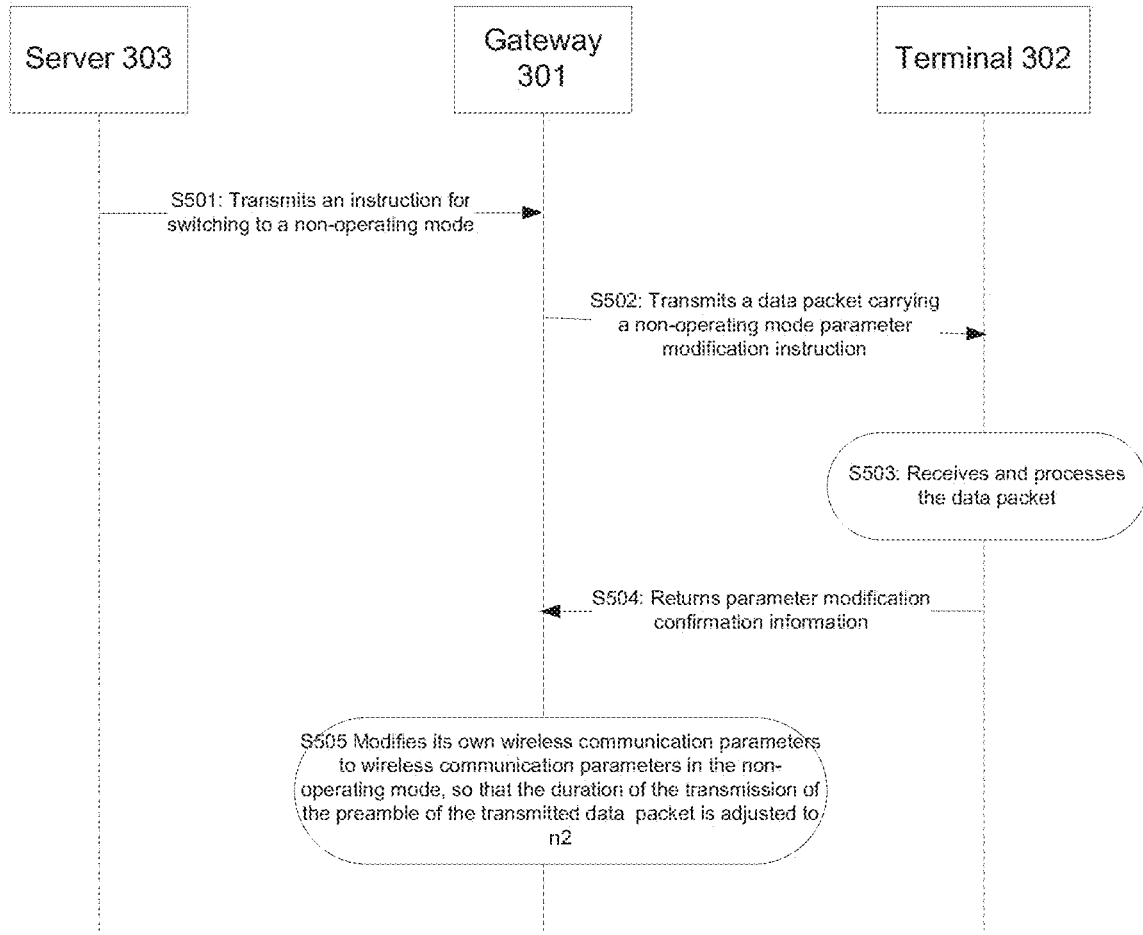
FIG. 5 is a flowchart of a method for a server to control a gateway and a terminal to switch to a non-operating mode according to an embodiment of the present disclosure.

Thus, as an implementation, $p_1$ may specifically be a value of the duration of the sleeping in the operating mode, and $q_1$ may specifically be a value of the duration of the channel activity detection in the operating mode. In a communication system based on LoRa technology according to some embodiments of the present disclosure, the server 303 may transmit an instruction for switching to a non-operating mode to the gateway 301 to control the gateway 301 and the terminal 302 to switch to a non-operating mode. A specific process is shown in FIG. 5 and comprises the following steps.

In step S501, the server 303 transmits an instruction for switching to a non-operating mode to the gateway 301.

In step S502, the gateway 301 issues a data packet carrying a non-operating mode parameter modification instruction to the terminal 302 according to the received instruction for switching to a non-operating mode to control the terminal 302 to modify corresponding parameters.

In step S503, the terminal 302 receives and processes the data packet transmitted by the gateway 301.

Specifically, the terminal 302 performs channel activity detection one time for duration of $q_1$ after sleeping for duration of $p_1$; the terminal 302 receives and processes the LoRa data packet which is transmitted by the gateway for duration of $n_1$ if the preamble of the data packet is detected; and if the terminal 302 confirms that the data packet carries the non-operating mode parameter modification instruction, the terminal 302 correspondingly modifies wireless communication parameters according to the non-operating mode parameter modification instruction issued by the gateway 301, adjusts the duration of the sleeping of the terminal 302 to a value of $p_2$ in a non-operating mode, and adjusts the duration of the channel activity detection to a value of $q_2$ in the non-operating mode, wherein $p_2-q_2>p_1-q_1$.

In step S504, the terminal 302 returns parameter modification confirmation information to the gateway 301.

In step S505, after receiving the parameter modification confirmation information returned by the terminal 302, the gateway 301 modifies its own wireless communication parameters to wireless communication parameters in the non-operating mode, so that the duration of the transmission of the preamble of the transmitted LoRa packet is adjusted to $n_2$.

Here, $p_2+q_2$ is less than or equal to $n_2$, and $n_2>n_1$; the wireless communication parameters modified by the gateway may comprise a spreading factor or a preamble length; or the wireless communication parameters modified by the gateway may comprise a spreading factor and a preamble length.

Then, the gateway 301 and the terminal 302 may communicate with each other according to the wireless communication parameters in the non-operating mode.

For example, the gateway 301 modifies the preamble length to a value of 65535 bits in the non-operating mode and modifies the spreading factor SF to a value of 12 in the non-operating mode according to the received instruction for switching to a non-operating mode. The bandwidth is still BW=125 kHz, and then the duration of the transmission of the preamble may become a value of $n_2$=2147590 ms in the non-operating mode.

In addition, the gateway 301 controls the terminal 302 to correspondingly modify, by issuing the non-operating mode parameter modification instruction to the terminal 302, the wireless communication parameters, for example, modify the spreading factor SF to a value of 12 in the non-operating mode, adjust the duration of the sleeping of the terminal to a value of $p_2$=2147490 ms in the non-operating mode, and adjust the duration of the channel activity detection to a value of $q_2$=61.1 ms in the non-operating mode. At this time, the current consumption of the terminal 302 is reduced to (20×61.1+0.001×2147490)/(61.1+2147490)=0.0015 mA. In this way, the duration of the sleeping of the terminal 302 is greatly increased, which further reduces the power consumption.

Figure 6:
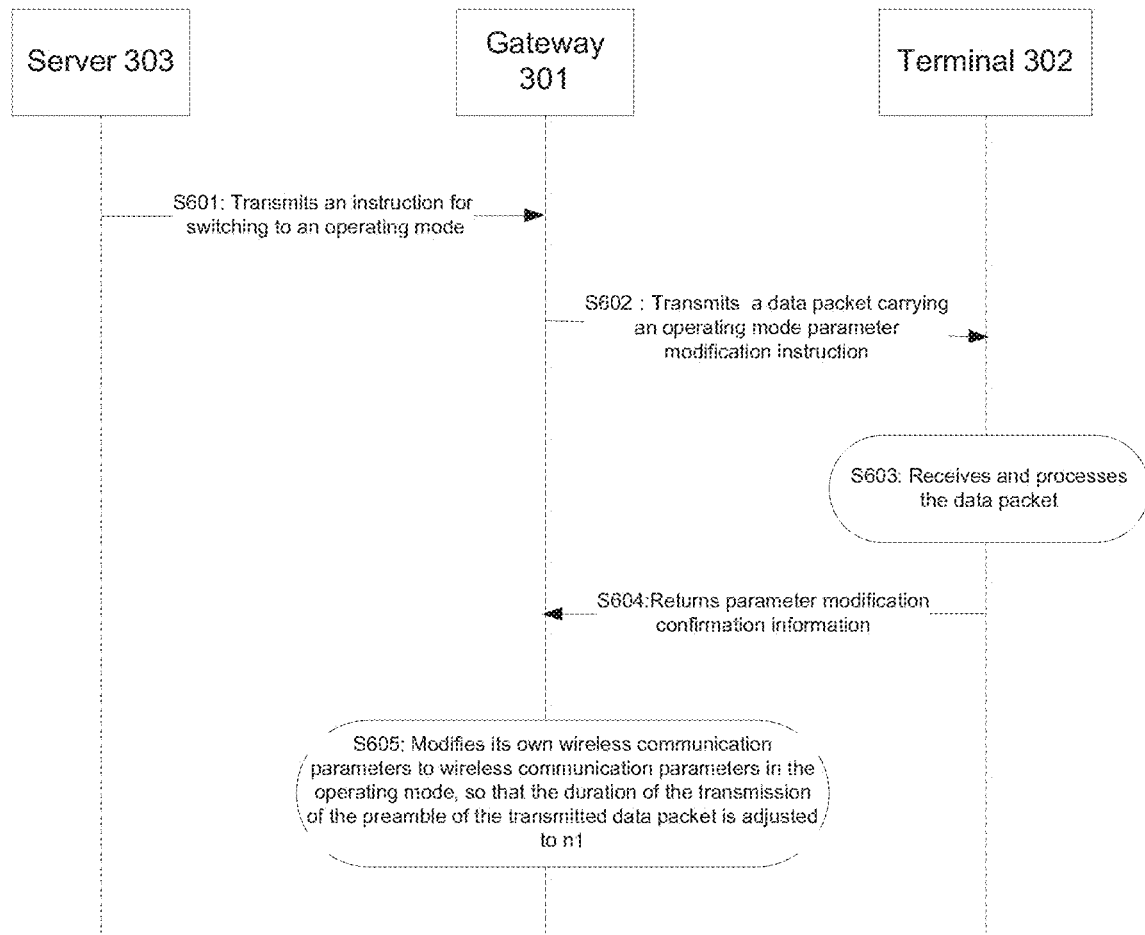
FIG. 6 is a flowchart of a method for a server to control a gateway and a terminal to switch to an operating mode according to an embodiment of the present disclosure.

In some embodiments, the server may also transmit an instruction for switching to an operating mode to the gateway 301 to control the gateway 301 and the terminal 302 to switch back to the operating mode. A specific process is shown in FIG. 6 and comprises the following steps.

In step S601, the server 303 transmits an instruction for switching to an operating mode to the gateway 301.

In step S602, the gateway 301 issues a data packet carrying an operating mode parameter modification instruction to the terminal 302 according to the received instruction for switching to an operating mode to control the terminal 302 to modify corresponding parameters.

In step S603, the terminal 302 receives and processes the data packet transmitted by the gateway 301.

Specifically, the terminal 302 performs channel activity detection one time for duration of $q_2$ after sleeping for duration of $p_2$; the terminal 302 receives and processes an LoRa data packet which is transmitted by the gateway for duration of $n_2$ if a preamble of the data packet is detected by the terminal; if the terminal 302 confirms that the data packet carries an operating mode parameter modification instruction, the terminal 302 correspondingly modifies wireless communication parameters according to the operating mode parameter modification instruction issued by the gateway 301, adjusts the duration of the sleeping to a value of $p_1$ in an operating mode, and adjusts the duration of the CAD to a value of $q_1$ in the operating mode.

In step S604, the terminal 302 returns parameter modification confirmation information to the gateway 301.

In step S605, after receiving the parameter modification confirmation information returned by the terminal 302, the gateway 301 modifies its own wireless communication parameters to wireless communication parameters in the operating mode, so that the duration of the transmission of the preamble of the transmitted LoRa packet is adjusted to $n_1$, wherein the wireless communication parameters modified by the gateway may comprise a spreading factor or a preamble length; or the wireless communication parameters modified by the gateway may comprise a spreading factor and a preamble length.

Figure 7:
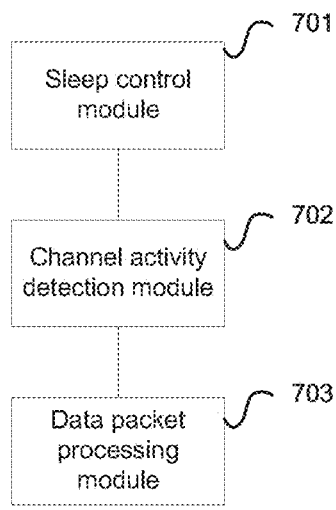
FIG. 7 is an internal structural block diagram of a terminal based on LoRa technology according to an embodiment of the present disclosure.

An internal structural block diagram of the above terminal 302, as shown in FIG. 7, comprises a sleep control module 701, a channel activity detection module 702, and a data packet processing module 703.

Here, the sleep control module 701 is configured to wake up the terminal and transmit a channel activity detection notification each time after the terminal sleeps for duration of $p_1$. Specifically, the sleep control module 701 may wake up the terminal and transmit a channel activity detection notification each time after the terminal sleeps for duration of $p_1$ in an operating mode; and may wake up the terminal and transmit a channel activity detection notification each time after the terminal sleeps for duration of $p_2$ in a non-operating mode.

The channel activity detection module 702 is configured to perform channel activity detection one time for duration of $q_1$ after receiving the channel activity detection notification, notifies the sleep control module to continue to sleep in response to a preamble of an LoRa data packet which is transmitted by a gateway for duration of $n_1$ not being detected, or receives the data packet in response to the preamble being detected. Specifically, after receiving the channel activity detection notification, the channel activity detection module 702 performs channel activity detection one time for duration of $q_1$ if the terminal is in the operating mode, and performs channel activity detection one time for duration of $q_2$ if the terminal is in the non-operating mode; notifies the sleep control module to continue to sleep if the preamble is not detected; and receives the data packet if the preamble is detected.

The data packet processing module 703 is configured to notify the sleep control module to continue to sleep after processing the data packet received by the channel activity detection module.

Specifically, when the data packet processing module 703 processes the data packet received by the channel activity detection module, if it is confirmed that the data packet carries a non-operating mode parameter modification instruction issued by the gateway, the data packet processing module 703 modifies its own wireless communication parameters according to modification parameters carried in the non-operating mode parameter modification instruction, adjusts the duration of the sleeping of the terminal 302 to a value of $p_2$ in the non-operating mode, and adjusts the duration of the channel activity detection to a value of $q_2$ in the non-operating mode; and if it is confirmed that the data packet carries an operating mode parameter modification instruction issued by the gateway, the data packet processing module 703 modifies its own wireless communication parameters according to modification parameters carried in the operating mode parameter modification instruction, adjusts the duration of the sleeping of the terminal 302 to a value of $p_1$ in the operating mode, and adjusts the duration of the channel activity detection to a value of $q_1$ in the operating mode.

Figure 8:
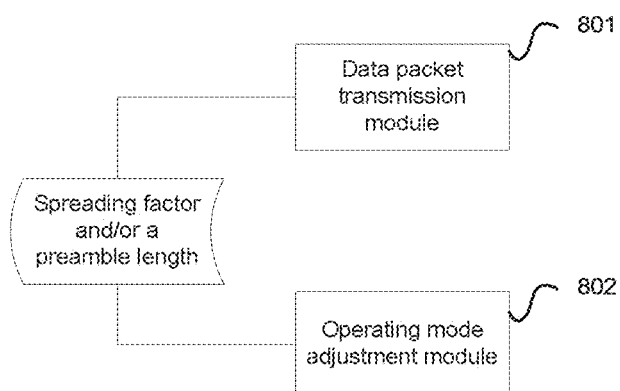
FIG. 8 is an internal structural block diagram of a gateway based on LoRa technology according to an embodiment of the present disclosure.

An internal structural block diagram of the above gateway 301, as shown in FIG. 8, comprises a data packet transmission module 801 and an operating mode adjustment module 802.

The data packet transmission module 801 is configured to transmit an LoRa data packet containing a preamble, wherein duration of the transmission of the preamble is $n_1$ in an operating mode.

The operating mode adjustment module 802 is configured to issue a non-operating mode parameter modification instruction to the terminal 302 according to an instruction for switching to a non-operating mode transmitted by the server 303, to control the terminal 302 to correspondingly modify its own wireless communication parameters, adjust duration of the sleeping of the terminal 302 to a value of $p_2$ in a non-operating mode, and adjust duration of channel activity detection to a value of $q_2$ in the non-operating mode; and modify wireless communication parameters of the gateway to wireless communication parameters in the non-operating mode, so that the duration of the transmission of the preamble of the transmitted LoRa packet is adjusted to a value of $n_2$ in the non-operating mode.

In addition, the operating mode adjustment module 802 may further issue an operating mode parameter modification instruction to the terminal 302 according to an instruction for switching to an operating mode transmitted by the server 303 to control the terminal 302 to correspondingly modify its own wireless communication parameters, adjust the duration of the sleeping of the terminal 302 to a value of $p_1$ in the operating mode, and adjust the duration of the channel activity detection to a value of $q_1$ in the operating mode; and modify wireless communication parameters of the gateway to wireless communication parameters in the operating mode, so that the duration of the transmission of the preamble of the transmitted LoRa packet is adjusted to a value of $n_1$ in the operating mode.

Here, the wireless communication parameters modified by the operating mode adjustment module 802 of the gateway may comprise a spreading factor or a preamble length; or the wireless communication parameters modified by the operating mode adjustment module 802 may comprise a spreading factor and a preamble length.

In the technical solutions according to the embodiments of the present disclosure, the gateway transmits an LoRa data packet containing a preamble to the terminal, wherein the duration of the transmission of the preamble is $n_1$; the terminal is woke up and performs channel activity detection one time for duration of $q_1$ each time after sleeping for duration of $p_1$; continues to sleep for the duration of $p_1$ if the preamble is not detected; and receives and processes the data packet and then continues to sleep for the duration of $p_1$ to wait for a next wakeup process if the preamble is detected, wherein $p_1 > q_1$, and $p_1 + q_1$ is less than or equal to $n_1$. Since the terminal may complete channel activity detection at least one time within the duration of $p_1 + q_1$, and $p_1 + q_1 \leq n_1$, that is, $n_1$ is greater than or equal to the duration of $p_1 + q_1$, then the channel activity detection necessarily occur one time within the duration of $n_1$. In this way, it ensures that the terminal may perform channel activity detection on a preamble of each data packet of the gateway at least one time, which also ensures that the terminal may receive the data packet transmitted by the gateway in time and perform effective interaction in time. At the same time, since the duration of $p_1$ of the sleeping is greater than the duration of $q_1$ of the channel activity detection, the terminal is in a sleep state for most of time, which may greatly reduce the power consumption of the terminal device.

Figure 9:
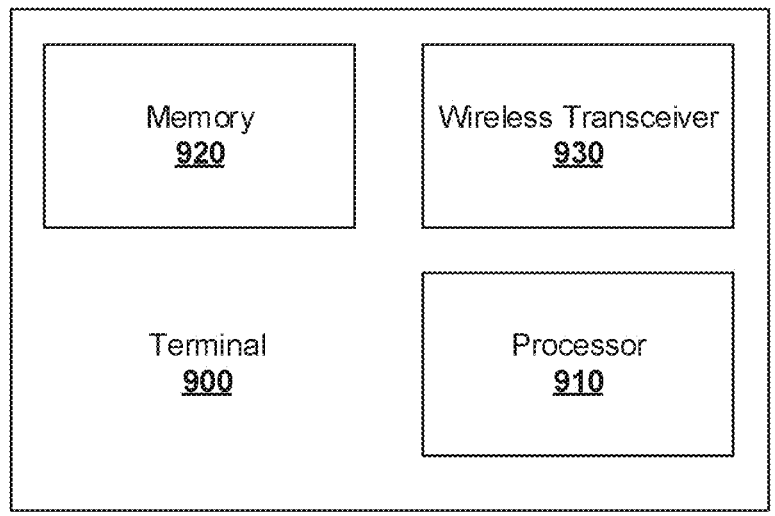
FIG. 9 is a block diagram of a hardware configuration of a terminal based on LoRa technology according to an embodiment of the present disclosure.

FIG. 9 is a block diagram of a hardware configuration of a terminal 900 based on LoRa technology according to an embodiment of the present disclosure. As shown in FIG. 9, the terminal 900 may comprise a processor 910, a memory 920 and a wireless transceiver 930. In some embodiments, the processor 910 may be communicatively coupled to the memory 920 and the wireless transceiver 930. In some embodiments, the wireless transceiver 930 may be configured to receive and/or transmit a wireless signal based on the LoRa technology. In some embodiments, the memory 920 may have stored therein instructions which, when executed by the processor 910, may cause the processor 910 to perform any steps of any method related to the terminal as described above.

Figure 10:
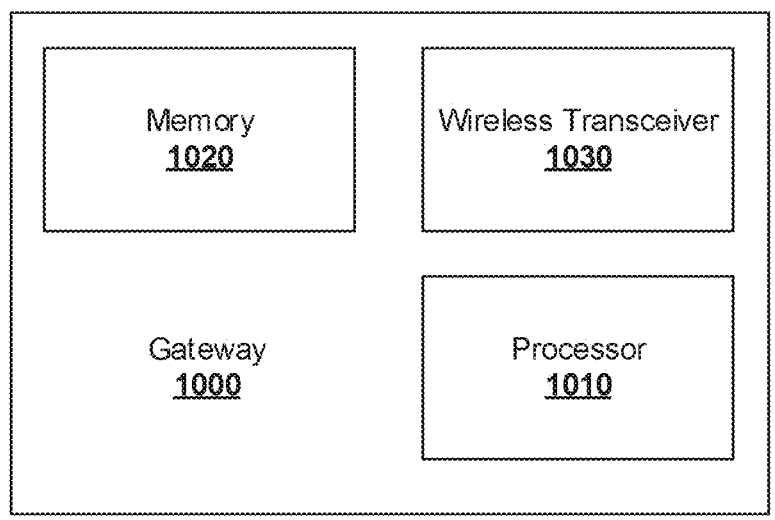
FIG. 10 is a block diagram of a hardware configuration of a gateway based on LoRa technology according to an embodiment of the present disclosure.

FIG. 10 is a block diagram of a hardware configuration of a gateway 1000 based on LoRa technology according to an embodiment of the present disclosure. As shown in FIG. 10, the gateway 1000 may comprise a processor 1010, a memory 1020, and a wireless transceiver 1030. In some embodiments, the processor 1010 may be communicatively coupled to the memory 1020 and the wireless transceiver 1030. In some embodiments, the wireless transceiver 1030 may be configured to receive and/or transmit a wireless signal based on the LoRa technology. In some embodiments, the memory 1020 may have stored therein instructions which, when executed by the processor 1010, may cause the processor 1010 to perform any steps of any method related to the gateway as described above.

Therefore, the communication system, the gateway, the terminal and the communication method based on the LoRa technology according to some embodiments of the present disclosure may not only ensure that the terminal receives data in time and performs effective interaction in time, but also may reduce the power consumption in an application scenario of bidirectional data interaction.

It may be understood by those skilled in the art that steps, measures, and solutions in various operations, methods and processes which have been discussed in the present disclosure may be alternated, changed, combined, or deleted. Further, other steps, measures, and solutions in various operations, methods, and processes which have been discussed in the present disclosure may also be alternated, modified, rearranged, decomposed, combined, or deleted. Further, steps, measures, and solutions in various operations, methods, and processes disclosed in the related art may also be alternated, modified, rearranged, decomposed, combined, or deleted.

It should be understood by those of ordinary skill in the art that the discussion of any of the above embodiments is merely exemplary, and is not intended to imply that the scope of the present disclosure (comprising claims) is limited to these examples. Within the spirit of the present disclosure, technical features in the above embodiments or different embodiments may also be combined, the steps may be implemented in any order, and there are many other variations of the different aspects of the present disclosure as described above, which are not provided in the detailed description for simplicity. Therefore, any omission, modification, equivalent substitution, improvement, etc. made within the spirit and principle of the present disclosure should be contained in the protection scope of the present disclosure.

We claim:

1. A communication system based on Long Range (LoRa) technology, the communication system comprising:
 a gateway configured to transmit an LoRa data packet containing a preamble, wherein a duration of the transmission of the preamble is $n_1$; and
 a terminal configured to perform channel activity detection one time for a duration of $q_1$ each time after sleeping for a duration of $p_1$,
 continue to sleep for the duration of $p_1$ in response to the preamble not being detected, or
 receive and process the data packet and then continue to sleep for the duration of $p_1$ in response to the preamble being detected:
 wherein $p_1 > q_1$, and $p_1 + q_1$ is less than or equal to $n_1$.

2. The system according to claim 1, wherein the communication system comprises an operating mode and a non-operating mode, $p_1$ is a value of the duration of the sleeping in the operating mode, $q_1$ is a value of the duration of the channel activity detection in the operating mode, and the system further comprises:
 a server configured to transmit an instruction for switching to the non-operating mode to the gateway,
 wherein the gateway is further configured to issue a non-operating mode parameter modification instruction to the terminal according to the received instruction for switching to the non-operating mode, and to control the terminal to modify corresponding parameters;
 the terminal is further configured to correspondingly modify its wireless communication parameters according to the non-operating mode parameter modification instruction issued by the gateway, adjust the duration of the sleeping to a value of $p_2$ in the non-operating mode and adjust the duration of the channel activity detection to a value of $q_2$ in the non-operating mode, and then return parameter modification confirmation information to the gateway; and
 the gateway is further configured to modify its own wireless communication parameters to wireless communication parameters in the non-operating mode after receiving the parameter modification confirmation information returned by the terminal, so that the duration of the transmission of the preamble of the transmitted LoRa data packet is adjusted to $n_2$, wherein $n_2 > n_1$;

wherein $p_2 - q_2 > p_1 - q_1$, and $p_2 + q_2$ is less than or equal to $n_2$.

3. The system according to claim 2, wherein
the server is further configured to transmit an instruction for switching to the operating mode to the gateway;
the gateway is further configured to issue a data packet carrying an operating mode parameter modification instruction to the terminal according to the received instruction for switching to the operating mode to control the terminal to modify corresponding parameters;
the terminal is further configured to, according to the operating mode parameter modification instruction issued by the gateway, correspondingly modify the wireless communication parameters, adjust the duration of the sleeping to the value of $p_1$ in the operating mode and adjust the duration of the channel activity detection to the value of $q_1$ in the operating mode, and then return parameter modification confirmation information to the gateway; and
the gateway is further configured to modify its own wireless communication parameters to wireless communication parameters in the operating mode after receiving the parameter modification confirmation information returned by the terminal, so that the duration of the transmission of the preamble of the transmitted LoRa data packet is adjusted to $n_1$.

4. The system according to claim 2, wherein the wireless communication parameters modified by the gateway comprise a spreading factor and/or a preamble length.

5. The system according to claim 3, wherein the wireless communication parameters modified by the gateway comprise a spreading factor and/or a preamble length.

6. A terminal based on Long Range (LoRa) technology, the terminal comprising:
a processor;
a wireless transceiver communicatively coupled to the processor and configured to receive or transmit a wireless signal based on the LoRa technology; and
a memory communicatively coupled to the processor and having stored therein instructions which, when executed by the processor, cause the processor to:
wake up the terminal every time after the terminal sleeps for a duration of $p_1$;
trigger the wireless transceiver to perform channel activity detection one time for a duration of $q_1$,
continue to sleep in response to a preamble of an LoRa data packet which is transmitted by a gateway for a duration of $n_1$ not being detected, or
trigger the wireless transceiver to receive the data packet in response to the preamble being detected; and
process the data packet received by the wireless transceiver and then continue to sleep for the duration of $p_1$;
wherein $p_1 > q_1$, and $p_1 + q_1$ is less than or equal to $n_1$.

7. The terminal according to claim 6, wherein the instructions which, when executed by the processor, cause the processor to:
after confirming that the data packet carries a non-operating mode/operating mode parameter modification instruction issued by the gateway, modify wireless communication parameters of the terminal according to modification parameters carried in the non-operating mode/operating mode parameter modification instruction,
adjust the duration of the sleeping to a value of $p_2/p_1$ in a non-operating mode/operating mode,
and adjust the duration of the channel activity detection to a value of $q_2/q_1$ in the non-operating mode/operating mode;
wherein $p_2 - q_2 > p_1 - q_1$, $p_2 + q_2$ is less than or equal to $n_2$, and $n_2$ is duration of transmission of a preamble of an LoRa data packet transmitted by the gateway in the non-operating mode.

8. A gateway based on Long Range (LoRa) technology, comprising:
a processor;
a wireless transceiver communicatively coupled to the processor and configured to receive or transmit a wireless signal based on the LoRa technology; and
a memory communicatively coupled to the processor and having stored therein instructions which, when executed by the processor, cause the processor to:
trigger the wireless transceiver to transmit an LoRa data packet containing a preamble, wherein duration of the transmission of the preamble is $n_1/n_2$ in an operating mode/non-operating mode; and
issue a non-operating mode/operating mode parameter modification instruction to a terminal according to an instruction for switching to a non-operating mode/operating mode from a server, to trigger the terminal to correspondingly modify its own wireless communication parameters, adjust duration of sleeping to a value of $p_2/p_1$ in the non-operating mode/operating mode and adjust duration of channel activity detection to a value of $q_2/q_1$ in the non-operating mode/operating mode; and modify wireless communication parameters of the gateway to wireless communication parameters in the non-operating mode/operating mode, so that the duration of the transmission of the preamble of the transmitted LoRa data packet is adjusted to a value of $n_2/n_1$ in the non-operating mode/operating mode,
wherein $p_2 - q_2 > p_1 - q_1$, and $p_2 + q_2$ is less than or equal to $n_2$, and
wherein $p_1$ is a value of the duration of the sleeping of the terminal in the operating mode, and $q_1$ is a value of the duration of the channel activity detection of the terminal in the operating mode.

9. The gateway according to claim 8, wherein the wireless communication parameters modified by the gateway comprise a spreading factor and/or a preamble length.

10. A communication method based on Long Range (LoRa) technology, the method comprising:
performing, by a terminal, channel activity detection one time for duration of $q_1$ each time after sleeping for duration of $p_1$;
continuing, by the terminal, to sleep for the duration of $p_1$ if a preamble of an LoRa data packet which is transmitted by a gateway for duration of $n_1$ is not detected by the terminal; and
receiving and processing, by the terminal, the data packet and then continuing to sleep for the duration of $p_1$ if the preamble is detected by the terminal;
wherein $p_1 > q_1$, and $p_1 + q_1$ is less than or equal to $n_1$.

11. The method according to claim 10, wherein the data packet is specifically a data packet carrying a non-operating mode parameter modification instruction; and wherein before receiving and processing the data packet, the method further comprises:
   transmitting, by the server, an instruction for switching to a non-operating mode to the gateway; and
   issuing, by the gateway, the data packet carrying the non-operating mode parameter modification instruction to the terminal according to the received instruction for switching to a non-operating mode;
wherein processing the data packet specifically comprises:
   after confirming that the data packet carries the non-operating mode parameter modification instruction issued by the gateway, modifying, by the terminal, the terminal's own wireless communication parameters according to modification parameters carried in the non-operating mode parameter modification instruction, adjusting the duration of the sleeping to a value of $p_2$ in the non-operating mode and adjusting the duration of the channel activity detection to a value of $q_2$ in the non-operating mode, and then returning parameter modification confirmation information to the gateway; and
wherein after receiving and processing the data packet, the method further comprises:
   after receiving the parameter modification confirmation information returned by the terminal, modifying, by the gateway, the gateway's own current wireless communication parameters to wireless communication parameters in the non-operating mode, so that the duration of the transmission of the preamble of the transmitted LoRa data packet is adjusted to $n_2$, wherein $n_2 > n_1$,
wherein $p_2 - q_2 > p_1 - q_1$, and $p_2 + q_2$ is less than or equal to $n_2$.

12. The method according to claim 11, wherein after the server transmits the instruction for switching to a non-operating mode to the gateway, the method further comprises:
   transmitting, by the server, an instruction for switching to the operating mode to the gateway;
   issuing, by the gateway, a data packet carrying an operating mode parameter modification instruction to the terminal according to the received instruction for switching to the operating mode to control the terminal to modify corresponding parameters;
   correspondingly modifying, by the terminal, wireless communication parameters according to the operating mode parameter modification instruction issued by the gateway, adjusting the duration of the sleeping to the value of $p_1$ in the operating mode and adjusting the duration of the channel activity detection to the value of $q_1$ in the operating mode, and then returning parameter modification confirmation information to the gateway; and
   after receiving the parameter modification confirmation information returned by the terminal, modifying, by the gateway, its own wireless communication parameters to wireless communication parameters in the operating mode, so that the duration of the transmission of the preamble of the transmitted LoRa data packet is adjusted to $n_1$.

13. The method according to claim 11, wherein the wireless communication parameters modified by the gateway comprise a spreading factor and/or a preamble length.

14. The method according to claim 12, wherein the wireless communication parameters modified by the gateway comprise a spreading factor and/or a preamble length.

* * * * *